Patented Apr. 4, 1939

2,152,991

UNITED STATES PATENT OFFICE 2,152,991

METHOD OF COATING SURFACES WITH POWDERED MATERIALS

Jack Alfred Viveash Fairbrother, Rugby, England, assignor to General Electric Company, a corporation of New York No Drawing. Application March 4, 1936, Serial No. 67,180. In Great Britain March 12, 1935

5 Claims. (Cl. 91—68)

This invention relates to methods of applying a coating of a powder, more particularly although not necessarily a powder which fluoresces under the bombardment of electrons and/or under the incidence of radiation to a surface which is usually of glass. Such coatings are required in vacuum or electric discharge devices in which light is caused to be emitted by stimulating fluorescent substances. The object of this invention is to provide a means of producing a firmly adherent coating of a fluorescent material on a surface such as a glass surface without impairing the properties of the material of which the coating is formed.

This invention consists in the use of an etching solution such as hydrofluoric acid as a binding agent which is applied so as to form a gel on the surface to which the fluorescent material in a powdered form will adhere firmly.

In carrying this invention into effect according to one method we wet a glass surface to be coated with hydrofluoric acid or an etching solution containing hydrofluoric acid so that the surface is attacked and there is formed a thin jelly like layer of glass dissolved in the etching solution. A convenient strength of hydrofluoric acid to use is a 60% hydrofluoric acid solution diluted some 20 or 30 times with water. This is left in contact with the glass surface which it is desired to coat with fluorescent or other material for about a minute. The solution can then be conveniently removed from the surface by the use of a pipette. The fluorescent powder is then sprayed on the surface and dried out by placing the vessel on a hot plate or by holding it over a flame. The powder may be sprayed on from an atomiser or dusted on and the excess shaken off. After drying the powder is found to be closely adherent and embedded in the glass. The adherence in some cases is made more complete owing to the powder being partly dissolved by the hydrofluoric acid. As an example of such powders zinc silicate or willemite may be taken. This fluoresces green under electron bombardment and a firmly adherent coating of this may be obtained by the method described above.

An advantage of the present invention is that when it is required to coat a glass surface with a powder which will fluoresce under electron bombardment it is essential that the surface of the powder exposed to the electrons should not be covered by material which does not fluoresce. It is well known that electrons can only penetrate thin thicknesses of material at low voltages and therefore if the particles of fluorescent material are completely embedded their fluorescent properties are impaired. Such a condition arises where sodium silicate is used as a binder for zinc silicate. The present invention obviates this difficulty as the particles are not embedded in a skin of non-fluorescent material.

What I claim as new and desire to secure by Letters Patent of the United States, is:

1. The method of producing a firmly adherent coating of a powdered material on a surface such as a sheet of glass which consists in first applying an etching solution to the surface so as to form a gel on the surface to which the powdered material will adhere and applying the powdered material on the said gel and then drying said surface.

2. The method of producing a firmly adherent coating of a powdered material on a surface such as a sheet of glass which consists in wetting the surface with an etching solution containing hydrofluoric acid which is allowed to set on the surface for a short interval of time to form a gel, removing the solution, spraying or dusting the powdered material on the wet surface of the gel to which said material adheres and finally drying the surface.

3. The method of producing a firmly adherent coating of a fluorescent material on a surface such as a sheet of glass which consists in wetting the surface with an etching solution containing hydrofluoric acid which is allowed to act on the surface for a short interval of time to form a gel, removing the solution, spraying or dusting the fluorescent material in powdered form on the wet surface of the gel to which said material adheres and finally drying the surface.

4. A glass body, a powdered material thereon and a bonding material for said powder on said glass body, said bonding material being a dried solution of glass and hydrofluoric acid.

5. A glass body, a powdered fluorescent material thereon and a bonding material for said fluorescent powder on said glass body, said bonding material being a dried solution of glass and hydrofluoric acid.

JACK ALFRED VIVEASH FAIRBROTHER.